UNITED STATES PATENT OFFICE.

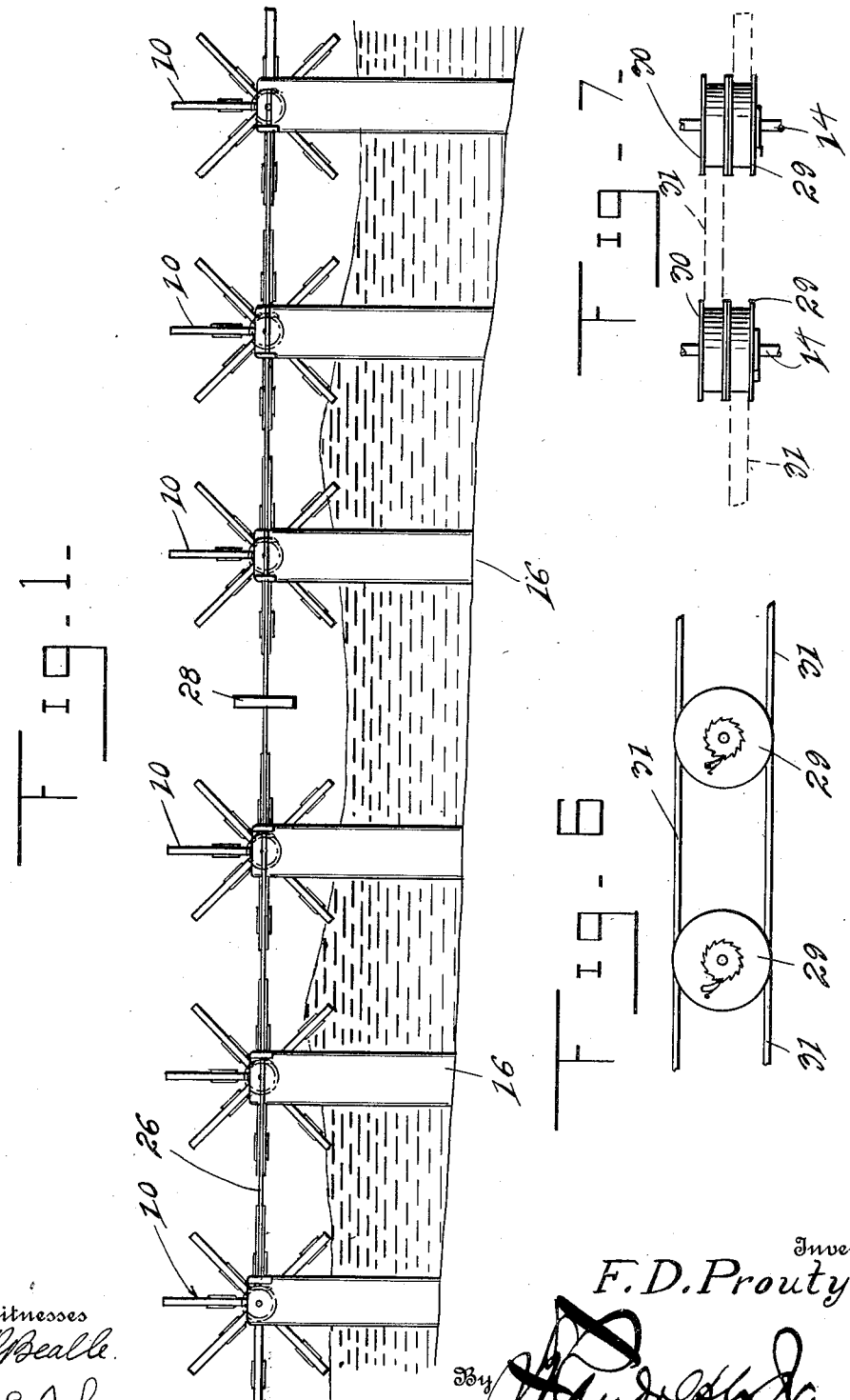

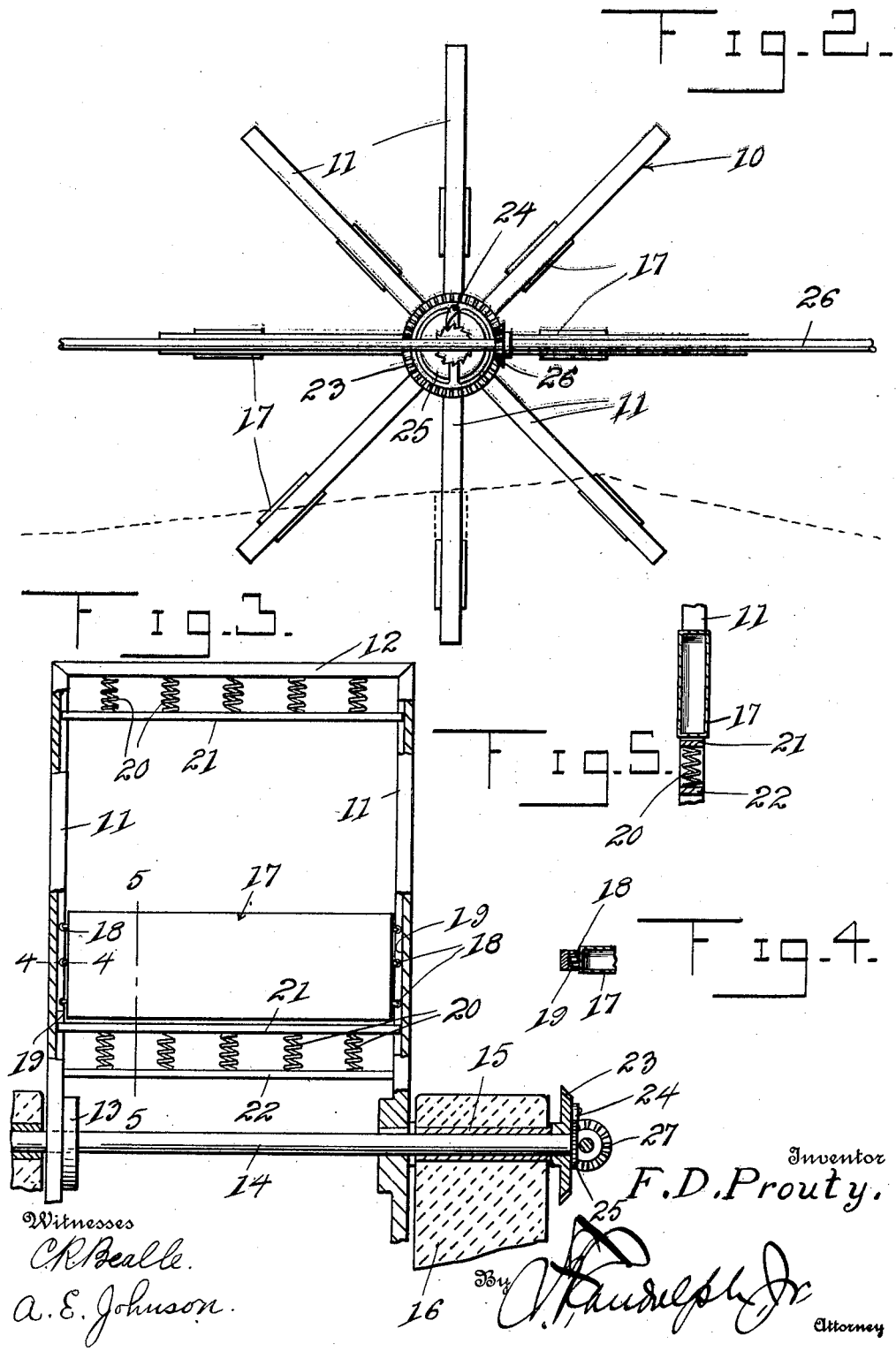

FRANK D. PROUTY, OF BANNING, CALIFORNIA.

WAVE-MOTOR.

1,090,751.         Specification of Letters Patent.     Patented Mar. 17, 1914.

Application filed August 18, 1913. Serial No. 785,422.

*To all whom it may concern:*

Be it known that I, FRANK D. PROUTY, a citizen of the United States, residing at Banning, in the county of Riverside and State of California, have invented certain new and useful Improvements in Wave-Motors; and I do hereby declare the following to be a full, clear, and exact description of the invention, such as will enable others skilled in the art to which it appertains to make and use the same.

This invention comprehends improvements in wave motors and relates more particularly to those of the type wherein one or more water wheels, which are rotated by the action of the waves, are employed for the purpose of generating power.

One of the objects of the invention is to provide a novel paddle, or water wheel, for use in connection with wave motors, which shall be of extremely simple construction, cheap to manufacture, and very efficient for the purpose intended.

Another and more specific object of the invention is to provide a wave motor with a paddle wheel including a plurality of radially extending paddle frames upon which sliding paddles are mounted, said paddles being lighter than the water so that they will float upon the surface.

With these and other objects in view, as will become more apparent as the description proceeds, the invention consists in certain novel features of construction, combination and arrangement of parts as will be hereinafter fully described and claimed.

For a complete understanding of my invention, reference is to be had to the following description and accompanying drawing, in which—

Figure 1 is a side elevation of my improved wave motor, showing the same as it appears in use, Fig. 2 is an enlarged side elevation of one of the paddle wheels and the gearing actuated thereby, Fig. 3 is a fragmentary vertical sectional view through a portion of one of the paddle wheels, parts thereof being shown in elevation, Fig. 4 is a fragmentary horizontal sectional view taken on the plane of line 4—4 of Fig. 3, Fig. 5 is a vertical sectional view taken on the plane of line 5—5 of Fig. 3, and Figs. 6 and 7 are detailed views illustrating the modified form of gearing, which may be employed in connection with my wave motor.

In the preferred embodiment of my invention I provide a plurality of paddle wheels, which are arranged in a seawardly extending line and which coöperate to drive a power shaft. It will be understood that any number of wheels may be employed, that various arrangements may be devised and that different forms of gearing may be used for collecting the power furnished by the rotating wheels.

Referring in detail to the drawing by numerals, 10 designates generally the paddle wheels. Each wheel comprises a plurality of radial paddle frames having side bars 11 and cross bars 12 connecting the outer extremities of the side bars. The inner ends of the U-shaped paddle frames are secured to hubs 13, which are keyed or otherwise rigidly secured to a rotatable shaft 14. This shaft is journaled through suitable bushings 15 secured in openings formed in preferably concrete piers 16. The piers may be of any desired construction and of any size and shape.

Each of the paddle frames carry a light paddle, generally designated 17. These paddles are preferably in the form of steel tanks, which are rectangular in cross section, as clearly shown in Fig. 5. Rollers 18 are secured to the ends of the tanks and work within channels 19, which extend longitudinally along the inner sides of the side bars 11 of the paddle frames. These tanks slide from the outer ends of the paddle frames to the inner ends thereof as the wheels are rotated, and to lessen the shock caused by the paddles being brought to an abrupt stop, I provide each frame with a pair of shock absorbing devices. These shock absorbing devices are preferably formed by a plurality of spiral springs 20, which are connected to sliding cross bars 21 and to the stationary cross bars 12 and 22. The cross bars 21 are opposed to the paddle 17, and their extremities work within the grooves or channels 19. A beveled gear 23 is loosely mounted upon one extremity of each of the shafts 14 and carries a spring pressed pawl 24 which engages a ratchet wheel 25 rigidly secured to the shaft 14. A power shaft 26 extends at right angles to the shaft 14 and may be suitably supported upon the piers 16. Beveled gears 27 are rigidly secured to the power shaft 26 and mesh with the gears 23. A belt wheel 28 may be secured to the power shaft 26 for the purpose of transferring its energy to any desired machine or place.

It will be seen that a movement of the waves toward the left hand side of Fig. 1 will cause the paddle wheels to be rotated in such a direction as to drive the gears 23 which in turn drive the shaft 26. In actual practice the paddle wheels are made of a relatively large diameter, forty feet being found to be about the right size, so that the lowermost paddle frames will always dip into the water irrespective of the height of the tide and the waves. As a paddle frame, which is approaching the water, passes below the horizontal plane of the shafts 14, the paddle 17, carried by said frame, slides outwardly, and as the paddle is forced through the water by a wave, said paddle rides upon the crest of the wave, thereby being driven with a maximum amount of power. As the paddle frame swings upwardly above the surface of the water and passes above the horizontal plane of the shafts 14, the paddle slides inwardly toward the center of the wheel and therefore retards the rotary motion of the wheel very little. In a motor of this type it is almost necessary to have the paddles movable with respect to the center of the wheel, because the waves act only upon the surface of the water and therefore would have little, if any, effect upon the paddles if they extended very far into the surface. If the paddles were stationary, the shifting tide would first submerge them to a too great a depth for efficient operation and would then leave them so high above the surface as to be only actuated upon by very high waves.

In Figs. 6 and 7, I have shown a slightly modified form of driving mechanism, which may be employed, if desired. It will be seen by reference to these figures that a pair of belt wheels 29 and 30 are secured to each of the shafts 14, and that corresponding wheels are connected by belts 31. It will be understood that as the waves recede, a reverse motion will be imparted to the paddle wheels, and if desired, suitable reverse gearing may be provided so as to utilize this backward movement of the waves.

From the foregoing description taken in connection with the accompanying drawings, it will be evident that I have provided an extremely simple and efficient wave motor, in which the number of paddle wheels employed is dependent upon the power desired, and which, because of the structure of the paddle wheels, is acted upon by the waves with their maximum amount of force.

While I have shown and described the preferred embodiment of my invention, it will be understood that minor changes in construction and arrangement of parts may be made without departing from the scope and spirit of the invention as claimed.

Having thus described my invention, I claim:

1. In a wave motor, a paddle wheel including a plurality of rectangular paddle frames, the side bars of said paddle frames being longitudinally grooved, a plurality of spiral springs secured to the end bars of the paddle frame, cross bars secured to said springs and projecting into the longitudinal grooves, whereby they are guided, and a float slidably connected to each frame for engagement with said cross bars.

2. In a wave motor, a paddle wheel including a plurality of radial paddle frames of rectangular formation, springs secured to the inner bars of said frame, a second cross bar connected to each of said springs and movable with relation to the frame, a paddle slidable within each of the frames and a cushioning device carried by the outer end of each of the frames.

In testimony whereof I affix my signature in presence of two witnesses.

FRANK D. PROUTY.

Witnesses:
   Geo. L. Wing,
   F. L. Prouty.

---

Copies of this patent may be obtained for five cents each, by addressing the "Commissioner of Patents, Washington, D. C."